(12) United States Patent
Paul et al.

(10) Patent No.: US 11,994,614 B2
(45) Date of Patent: May 28, 2024

(54) TESTING DEVICE FOR TESTING A DISTANCE SENSOR OPERATING WITH ELECTROMAGNETIC WAVES

(71) Applicant: dSPACE GmbH, Paderborn (DE)

(72) Inventors: Jeffrey Paul, Torrance, CA (US); Jonathan Watkins, Lakewood, CO (US); Michael Rozmann, Eichenau (DE)

(*) Notice: Subject to any disclaimer, the term of this patent is extended or adjusted under 35 U.S.C. 154(b) by 362 days.

(21) Appl. No.: 17/425,402

(22) PCT Filed: Feb. 11, 2020

(86) PCT No.: PCT/EP2020/053505
§ 371 (c)(1),
(2) Date: Jul. 23, 2021

(87) PCT Pub. No.: WO2020/165191
PCT Pub. Date: Aug. 20, 2020

(65) Prior Publication Data
US 2022/0099797 A1   Mar. 31, 2022

Related U.S. Application Data (60) Provisional application No. 62/803,923, filed on Feb. 11, 2019.

(51) Int. Cl.
*G01S 7/40* (2006.01)
*G01S 13/08* (2006.01)

(52) U.S. Cl.
CPC .............. *G01S 7/40* (2013.01); *G01S 7/4052* (2013.01); *G01S 7/4082* (2021.05); *G01S 13/08* (2013.01)

(58) Field of Classification Search
CPC ........ G01S 7/40; G01S 7/4052; G01S 7/4082; G01S 7/4086; G01S 7/4095; G01S 13/08; G01S 13/931
See application file for complete search history.

(56) References Cited

U.S. PATENT DOCUMENTS 3,700,780 A * 10/1972 Roeschlein ............. G06F 7/584
367/13
3,732,568 A * 5/1973 O'Mary ................... G01S 7/40
342/171

(Continued)

FOREIGN PATENT DOCUMENTS

CN     108051783 A    5/2018
DE       3888993 T2   10/1994
(Continued)

OTHER PUBLICATIONS

Rozmann, Michael; "Testing Radar Sensors with Real Radar Echoes: Real Echos in the Lab"; dSPACE Magazine Feb. 2017; Dec. 2017; https://www.dspace.com/en/inc/home/news/radar-test-bench-real-echoes.cfm; 4 Pages.

(Continued)

*Primary Examiner* — Peter M Bythrow
(74) *Attorney, Agent, or Firm* — Patrick D. Duplessis (57) ABSTRACT

A testing device for testing a distance sensor includes a receiving element for receiving an electromagnetic free-space wave as a receive signal, and a radiating element for radiating a simulated reflection signal. The receive signal or a signal derived therefrom is routed via a time delay circuit, and is thus time-delayed to a time-delayed signal. The time-delayed signal or a signal derived therefrom is radiated as the simulated reflection signal. The time delay circuit has an analog delay path and a digital delay path. The analog delay path implements shorter time delays than the digital delay path, apart from a possible overlap region. An input switch is used to switch the receive signal or the signal derived therefrom to the input of the analog delay path or to the input of the digital delay path, and the signal becomes the time-delayed signal after passing through the connected delay path.

12 Claims, 7 Drawing Sheets

(56) References Cited

U.S. PATENT DOCUMENTS

| | | | | |
|---|---|---|---|---|
| 3,835,234 | A * | 9/1974 | Murphree | G01S 7/52004 434/6 |
| 4,168,582 | A * | 9/1979 | Heidrich | G09B 9/40 377/54 |
| 4,450,447 | A * | 5/1984 | Zebker | G01S 7/4052 342/25 R |
| 4,613,863 | A * | 9/1986 | Mitchell | G01S 7/38 342/14 |
| 5,177,488 | A | 1/1993 | Wang | |
| 5,339,087 | A * | 8/1994 | Minarik | H01Q 3/2682 342/172 |
| 5,493,304 | A * | 2/1996 | Lee | G01S 7/4052 342/173 |
| 5,518,400 | A * | 5/1996 | Otoide | G01S 7/4052 434/4 |
| 5,892,479 | A * | 4/1999 | Mills | G01S 7/4052 342/170 |
| 5,920,281 | A * | 7/1999 | Grace | G01S 7/4052 342/172 |
| 6,067,042 | A * | 5/2000 | Lee | G01S 7/4052 342/175 |
| 6,191,735 | B1 * | 2/2001 | Schineller | H01Q 3/36 333/164 |
| 6,337,660 | B1 * | 1/2002 | Esman | H01Q 3/2676 342/375 |
| 6,346,909 | B1 * | 2/2002 | Johnson, Jr. | G01S 7/4052 342/170 |
| 6,624,780 | B1 * | 9/2003 | Fouts | G01S 7/38 342/25 R |
| 6,989,788 | B2 * | 1/2006 | Marion | H01Q 3/2682 333/164 |
| 7,145,504 | B1 * | 12/2006 | Newberg | G01S 7/4052 342/195 |
| 8,466,831 | B2 * | 6/2013 | Pierno | H01Q 3/2676 342/174 |
| 11,415,668 | B2 * | 8/2022 | Gruber | G01S 7/4052 |
| 2003/0164793 | A1 * | 9/2003 | Ludewig | G01S 7/4052 342/170 |
| 2003/0222693 | A1 * | 12/2003 | Cohen | H04L 7/0037 327/277 |
| 2004/0012517 | A1 * | 1/2004 | Abou-Jaoude | G01S 7/4052 342/171 |
| 2006/0012513 | A1 * | 1/2006 | Walton | G01S 7/0235 342/135 |
| 2009/0058716 | A1 * | 3/2009 | Thomas | H03K 5/13 342/172 |
| 2018/0203098 | A1 | 7/2018 | Heuel et al. | |
| 2019/0391234 | A1 * | 12/2019 | Gruber | G01S 7/4052 |
| 2020/0300968 | A1 * | 9/2020 | Gruber | G01S 7/4052 |
| 2021/0018591 | A1 * | 1/2021 | Gruber | G01S 7/4052 |

FOREIGN PATENT DOCUMENTS

| | | |
|---|---|---|
| DE | 102007002370 A1 | 7/2008 |
| DE | 102017217800 A1 | 7/2018 |
| JP | H0540170 A | 2/1993 |
| JP | 2002-286831 A | 10/2002 |
| JP | 2009-257828 A | 11/2009 |
| JP | 2017-166940 A | 9/2017 |
| KR | 10-1235057 B1 | 2/2013 |

OTHER PUBLICATIONS

International Search Report and Written Opinion of the International Searching Authority; Application No. PCT/EP2020/053505; Completed: Mar. 31, 2020; dated Apr. 8, 2020; 15 Pages.

* cited by examiner

TESTING DEVICE FOR TESTING A DISTANCE SENSOR OPERATING WITH ELECTROMAGNETIC WAVES

TECHNICAL FIELD

The invention relates to a testing device for testing a distance sensor operating with electromagnetic waves, having a receiving element for receiving an electromagnetic free-space wave as a receive signal $S_{RX}$, having a radiating element for radiating a simulated electromagnetic reflection signal $S_{TX}$, wherein the receive signal $S_{RX}$ or a signal $S'_{RX}$ derived from the receive signal $S_{RX}$ is routed via a time delay circuit with a predeterminable time delay $t_{delay,soll}$, and is thus time-delayed to a time-delayed signal $S_{delay}$, wherein the time-delayed signal $S_{delay}$ or a signal $S'_{delay}$ derived from the time-delayed signal $S_{delay}$ is radiated as the simulated reflection signal $S_{TX}$ via the radiating element.

BACKGROUND

The aforementioned testing devices for testing distance sensors have been known for some time in the field of control unit development and control unit testing—especially in the automotive sector. A frequent test scenario here is to test the functionality of a production control unit using a simulated environment. For this, the environment of the control unit is calculated in part or completely in real time using a powerful simulation environment, wherein the simulation environment generates physical signals, which are input signals of the control unit, and the simulation environment records the output signals generated by the control unit and incorporates them into the real-time simulation. This allows control units to be tested safely in a simulated environment under virtually "real" conditions. How realistic the test depends on the quality of the simulation environment and the simulation it calculates. Control units can thus be tested in a closed loop, which is why such test scenarios are also referred to as hardware in the loop tests.

The present case deals with the testing of distance sensors that operate with electromagnetic waves. In the automotive sector, radar sensors are predominantly used. In principle, however, distance sensors can also be tested that operate in a different frequency range of electromagnetic waves, for example in the visible light range, or that operate with electromagnetic radiation sources that radiate electromagnetic waves with a long coherence length, such as in laser applications (e.g., lidar).

Distance sensors are increasingly being used in modern vehicles to provide the vehicle and its assistance systems with environmental information. IN this manner, the position (distance) and speed of objects in the vehicle environment are determined. Assistance systems that use such environmental information include adaptive cruise control (ACC) and autonomous emergency breaking (AEB). It is understandable that the testing of such safety-relevant assistance systems must be carried out with great care, wherein the propagation behavior of the electromagnetic waves must also be taken into account as realistically as possible. In the past, this was mainly done by very costly and time-consuming real driving tests. These driving tests are increasingly being replaced by the testing devices described above for testing a distance sensor, also known as test benches, in which free space waves are also used. Such test benches are also called OTA test benches (over the air), in which the distance sensor to be tested actually radiates, i.e., unguided, electromagnetic waves into the free space and also receives electromagnetic waves from the free space as a simulated reflection signal. The advantage of such OTA test benches is the extensive testing of the entire effect chain in connection with the distance sensor to be tested, including the radiating and receiving behavior in which the sensor radiating element and the sensor receiving element are involved.

Regardless of the type of electromagnetic wave used by the distance sensor being tested, testing distance sensors places extremely high demands on the required electronic signal processing. Distances of an object in the environment are usually determined directly by the signal transit time, which requires the electromagnetic waves radiated to the object and reflected from the object back to the distance sensor. Radial velocity components of objects in the environment are determined by frequency shifts between the radiated electromagnetic wave and the reflected electromagnetic wave (Doppler shift).

Due to the electromagnetic waves propagating at the speed of light, very short signal propagation times must be resolved here. For example, in order to detect a minimum distance of one meter, signal propagation times in the nanosecond range must be resolved. If larger distances are to be measured in the range of centimeters, i.e., independent of the question of minimum distance, it must also be possible to resolve differences in propagation time in the sub-nanosecond range.

The present invention deals with the simulation of an object which is located at a certain distance from a distance sensor to be tested. This is not about the mechanical structure of the testing device, but about its electronic implementation with regard to signal processing.

The electromagnetic waves radiated by the distance sensor to be tested are not actually to be reflected in the test bench or in the testing device; rather, the radiated electromagnetic waves are received by a receiving element of the testing device and processed in downstream, fast signal electronics—a distance and movement simulator—namely delayed in running time by the time delay circuit. Depending on the distance to be simulated to a simulated surrounding object from the distance sensor to be tested, signals delayed in time are generated by the signal electronics including the time delay circuit and radiated as a simulated—i.e., not actual—reflection signal via the radiating element of the testing device again in the direction of the distance sensor to be tested. The distance sensor thus creates the impression of a real environment with, if necessary, several objects at different distances in the simulated environment.

Testing devices known from the prior art ("Echte Echos im Labor": dSPACE Magazine 2/2017, December 2017) are characterized by a mechanical test bench structure that will not be discussed here, and by signal electronics for generating a simulated reflection signal, which is what is at issue here, especially the time delay of the receive signal by a predeterminable time delay. This predeterminable time delay results from the distance to be simulated considering the speed of light as signal propagation speed of the electromagnetic waves.

It is known from the prior art to configure the time delay circuit in the form of an analog delay path. Here, for example, different physically implemented signal paths are used, for example in the form of fiber optic cables. These signal paths can be connected in series, depending on the distance to be simulated and the resulting time delay to be specified, in order to simulate the path to be simulated physically as accurately as possible. The advantage of this implementation is that very short transit times can be implemented—and thus very short distances to be simulated—since analog signal processing is extremely fast compared to a digital solution, i.e., a solution via a digital scanning system, and only minimal dead times result. In this manner, the shortest distances in the range of several meters can be simulated.

Solutions are also known that are based on a digitally implemented delay path. Digital delay paths are scanning systems which inherently operate quantized in time. The cycle times of digital systems often far exceed the transit times of analog signal processing, so that short distances in the range of a few meters cannot be implemented with digitally implemented delay paths.

SUMMARY

The object of the invention is thus to design and further develop the testing device described above for testing a distance sensor operating with electromagnetic waves in such a manner that it is relatively easy to generate a desired time-delayed reflection signal from a receive signal and to cover a large range of predeterminable time delays so that the testing device is able to simulate a large distance range.

In the case of the testing device described above, the object is initially and essentially achieved in that the time delay circuit has an analog delay path with a predeterminable time delay and a digital delay path with a likewise predeterminable time delay, wherein the analog delay path implements shorter time delays than the digital delay path, apart from a possible overlap region. It is also provided that the receive signal $S_{RX}$ or the signal $S'_{RX}$ derived from the receive signal $S_{RX}$ is connected either to the input of the analog delay path or to the input of the digital delay path by an input switch, and the signal becomes the time-delayed signal $S_{delay}$ after passing through the connected delay path.

The testing device thus implements a time delay circuit using analog and digital circuit technology, so that both very short distances (analog delay path) and significantly longer distances (digital delay path) can be simulated. Depending on how large the predetermined time delay is, the input switch directs the receive signal $S_{RX}$ or the signal $S'_{RX}$ derived from the receive signal $S_{RX}$ either to the analog delay path or to the digital delay path. The signal to be delayed thus passes through either the analog delay path or the digital delay path; the input switch does not permit both lines to be simultaneously supplied with the signal to be delayed.

If it is said that the receive signal $S_{RX}$ or a signal $S'_{RX}$ derived from the receive signal $S_{RX}$ is routed via a time delay circuit, then this means that there can be further signal processing steps between the receiving element and the actual time delay circuit, for example the receive signal $S_{RX}$ can be filtered before it is further processed—i.e., delayed.

In a preferred design of the testing device, it is provided that the output of the analog delay path or the output of the digital delay path is contacted by an output switch and thus at least an indirect connection is established between the contacted output of the affected delay path and the radiating element. The output switch thus assumes the function at the output of the testing device corresponding to the function of the input switch at the input of the testing device. Here, too, either the analog delay path or the digital delay path is contacted and the signal tapped there is fed directly or indirectly to the radiating element. If the tapped signal is routed indirectly to the radiating element from the respective contacted output of the affected delay path, this also means that further signal processing steps are carried out here, if necessary.

In this context, a further development of the testing device provides for a control device to synchronously control the input switch and the output switch so that either the analog delay path is contacted on the input and output sides, or the digital delay path is contacted on the input and output sides. In this configuration, only one of the two signal delay paths is integrated into the signal path from the receiving element to the radiating element of the testing device. The other delay path then has no influence whatsoever.

In an alternative design of the testing device, an output summing unit is provided, wherein one input of the output summing unit contacts the output of the analog delay path, and another input of the output summing unit contacts the output of the digital delay path. The output summing unit then forms the sum signal from the output signal of the analog delay section and the output signal of the digital delay section. Here, too, the output of the output summing unit is at least indirectly connected to the radiating element. In this case, an output switch can be dispensed of.

In the context described above, it may be additionally provided, according to a preferred configuration, that a bridging device above the input switch ensures that the receive signal $S_{RX}$ or a signal $S'_{RX}$ derived from the receive signal $S_{RX}$ is connected both to the input of the analog delay path and to the input of the digital delay path. This is of particular interest if the analog delay path is given a different time delay than the digital delay path. Then it is possible to simulate two objects at different distances simultaneously by summing the output signals while simultaneously using the analog delay path and the digital delay path.

A further configuration of the testing device is characterized in that the analog delay path has a plurality of analog delay sub-paths which can be connected in series, a plurality of switches and a switching logic, wherein the switching logic is able to be preset with a time delay, and the switching logic connects the delay sub-paths in series with the switches in such a manner that the predetermined time delay is achieved in the best possible manner. The smallest distance that is able to be simulated corresponds to the length of the smallest analog delay sub-path. However, it must be taken into account that the path from the receiving element to the input of the analog delay path and from the output of the analog delay path to the radiating element also has a signal propagation time which must always be taken into account. This can take place in the mentioned switching logic of the analog delay path, but it can also take place in a higher-level control system. Since the lengths of the delay sub-paths are defined, a predetermined time delay cannot normally be set entirely exactly, but only as exactly as the length grid of the delay sub-paths permits. What has been done to take into account the other signal propagation time with respect to the analog delay path naturally also applies to the signal path via the digital delay path.

With respect to the analog delay path, a preferred design of the testing device provides that the lengths of the analog delay sub-paths behave like powers of two with respect to one another, i.e., are binary parts of one another. The length of the next larger analog delay sub-path is therefore always twice the length of the next smaller analog delay sub-path. The advantage here is that the number of switching points between the delay subpaths is very small, especially compared to delay sub-paths of the same length, so that unnecessary reflections are avoided, and a high signal quality can be achieved.

With respect to the digital delay path, another preferred design of the testing device provides that the digital delay path connected in series from its input to its output has: an analog-to-digital converter, a digital delay element with a switching logic and a digital-to-analog converter. A delay time can be predetermined for the switching logic and the switching logic internally switches the digital delay element such that the predetermined delay time is achieved in the best possible manner.

Preferably, the digital delay element and/or the switching logic is implemented by a Field Programmable Gate Array (FPGA). A variable delay can then be implemented by a cascade of D-flip-flops with signal taps after each flip-flop.

The digital delay path represents a temporally discrete sampling system. Sampling already begins with the analog-to-digital conversion, which takes place periodically in fixed time steps. Sampling is accompanied by a periodic repetition of the spectrum of the sampled signal in the frequency range. The digital-to-analog conversion can therefore be used—especially with special filtering with a bandpass or a low-pass filter—to cause a frequency shift of the signal to be delayed. If this is the case, it is provided in a a further preferred design that the analog delay path has a mixer and an oscillator, wherein the mixer and the oscillator signal are used to frequency-shift the receive signal $S_{RX}$ or the signal $S'_{RX}$ derived from the receive signal $S_{RX}$ in such a manner that the output signal of the analog delay path and the output signal of the digital delay path have the same frequency; this is the center frequency when taken into account that the receive signal also has a certain bandwidth. Using the mixer in the analog delay path with a suitable selection of the frequency of the oscillator signal achieves the same effect as using analog-to-digital conversion in the digital delay path. This has the advantage that the output signals of both delay paths are influenced in the same manner in terms of frequency. If this is the case, subsequent signal processing can be performed jointly and uniformly, both for the output signal of the analog delay path and for the output signal of the digital delay path. It is therefore not necessary to subsequently implement separate signal processing paths, only one single further signal processing path has to be implemented, i.e., for example, an upward mixing of a signal, a frequency shift by a desired Doppler frequency or a corresponding frequency filtering.

A further design is characterized in that, before it is time-delayed, the receive signal $S_{RX}$ is mixed down with a mixer to a lower intermediate frequency and the low-frequency signal $S'_{RX}$, thus derived from the receive signal $S_{RX}$, is then time-delayed. This procedure has the advantage that the frequencies to be processed are considerably lower (even if the bandwidth of the signal is maintained). For example, a receive signal could have a frequency of 77 GHz and be mixed down with the proposed mixer to an intermediate frequency of only 2 GHz, which places considerably less demands on the components that implement the subsequent signal processing.

In a further design of the testing device, it is provided that a Doppler generator is interposed between the outputs of the analog delay path and the digital delay path on one side and the radiating element on the other side, which frequency shifts the time-delayed signal $S_{delay}$ by a predeterminable Doppler frequency and thus generates the derived signal $S'_{delay}$. A radial motion component to the distance sensor to be tested can be simulated by the—often only slight—frequency shift.

It is provided in a very preferred design of the testing device that the analog delay path implements time delays up to a maximum time delay $t_{analog,max}$ and that the digital delay path implements time delays up to a minimum time delay $t_{digital,min}$. It is important here that the maximum time delay $t_{analog,max}$ of the analog delay path is greater than the minimum time delay $t_{digital,min}$ of the digital delay path, so that there is an overlap range from $t_{digital,min}$ to $t_{analog,max}$ of the time delays. In this overlap range, a time delay could be implemented both by the analog delay path and by the digital delay path.

It has turned out to be extremely advantageous if a control device controls the input switch in such a way that, in the event of changing predetermined time delays in the overlap range of the time delays, a hysteresis is applied between the analog delay path and the digital delay path. Thus, the switching frequency of the change between the use of the analog delay path and the digital delay path can be minimized. This is relevant, for example, for the simulation of typical situations in urban traffic with relatively close surrounding objects and, for example, during stop-and-go in traffic jams. In practice, this is achieved by switching from the analog delay path to the digital delay path only in the range of the maximum analog time delay $t_{analog,max}$ and vice versa switching from the digital delay path to the analog delay path only in the range of the minimum digital time delays $t_{digital,min}$.

BRIEF DESCRIPTION OF THE DRAWINGS

In detail, there is a plurality of possibilities for designing and further developing the testing device. This is shown in conjunction with the drawings in the following figures.

DETAILED DESCRIPTION

Figure 1:
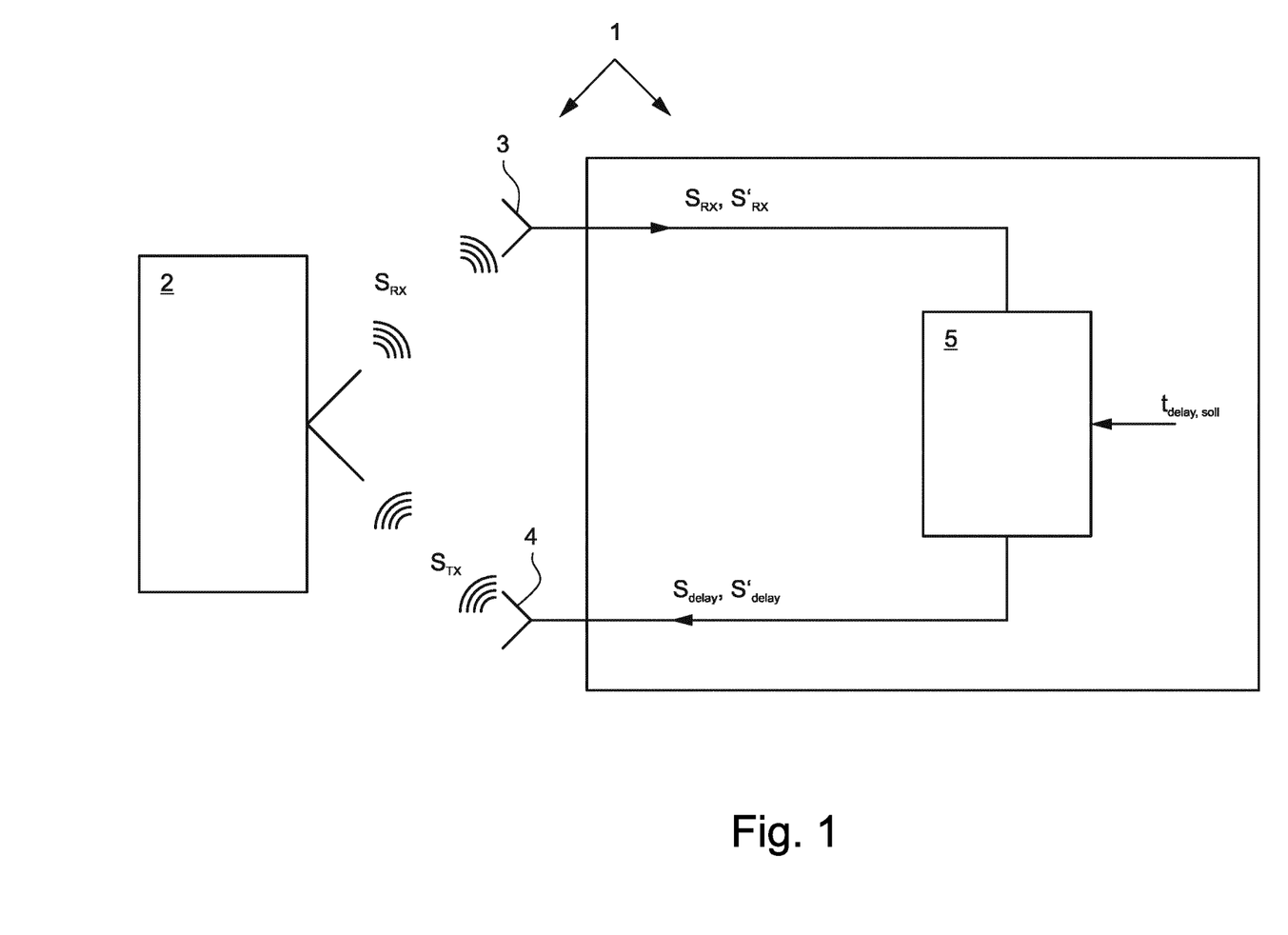
FIG. 1 illustrates a known testing device for testing a distance sensor operating with electromagnetic waves.

FIGS. 1 to 7 each show a testing device 1 for testing a distance sensor 2 operating with electromagnetic waves, which is only schematically shown in FIG. 1. The distance sensor 2 radiates an electromagnetic free-space wave in the direction of the testing device 1 and receives a simulated electromagnetic reflection signal $S_{TX}$ generated by testing device 1. The testing device 1 has a receiving element 3 for receiving the free space wave radiated by the distance sensor 2 and the testing device 1 has a radiating element 4 for radiating the simulated electromagnetic reflection signal $S_{TX}$. The distance sensor 2 itself does not belong to the testing device 1. The receive signal $S_{RX}$ or a signal $S'_{RX}$ derived from the receive signal $S_{RX}$ is routed via a time delay circuit 5, wherein a time delay in a certain range can be predetermined for the time delay circuit 5. The input signal of the time delay circuit 5 is thus time-delayed to a time-delayed signal $S_{delay}$. The time-delayed signal $S_{delay}$ or a signal $S'_{delay}$ derived from the time-delayed signal $S_{delay}$ is then radiated as the simulated reflection signal $S_{TX}$ via the radiating element 4.

In FIG. 1 it is indicated that the time delay $t_{delay,soll}$ to be achieved is to be supplied to the time delay circuit 5 as information. For the implementation of the testing device 1 shown here, the exact technical implementation of how exactly this information is supplied to the time delay circuit 5 is not of importance. Usually, the specification for the time delay to be set comes from an environment simulator that simulates the scene to be simulated with surrounding objects and provides corresponding position, velocity and/or acceleration information of the surrounding objects. If, for example, it is known that the distance of the object to be simulated from the distance sensor to be tested is 30 m, a corresponding time delay is calculated taking into account the speed of light as the signal propagation time of an electromagnetic wave and $t_{delay,soll}$ is specified as the time delay.

Figure 2:
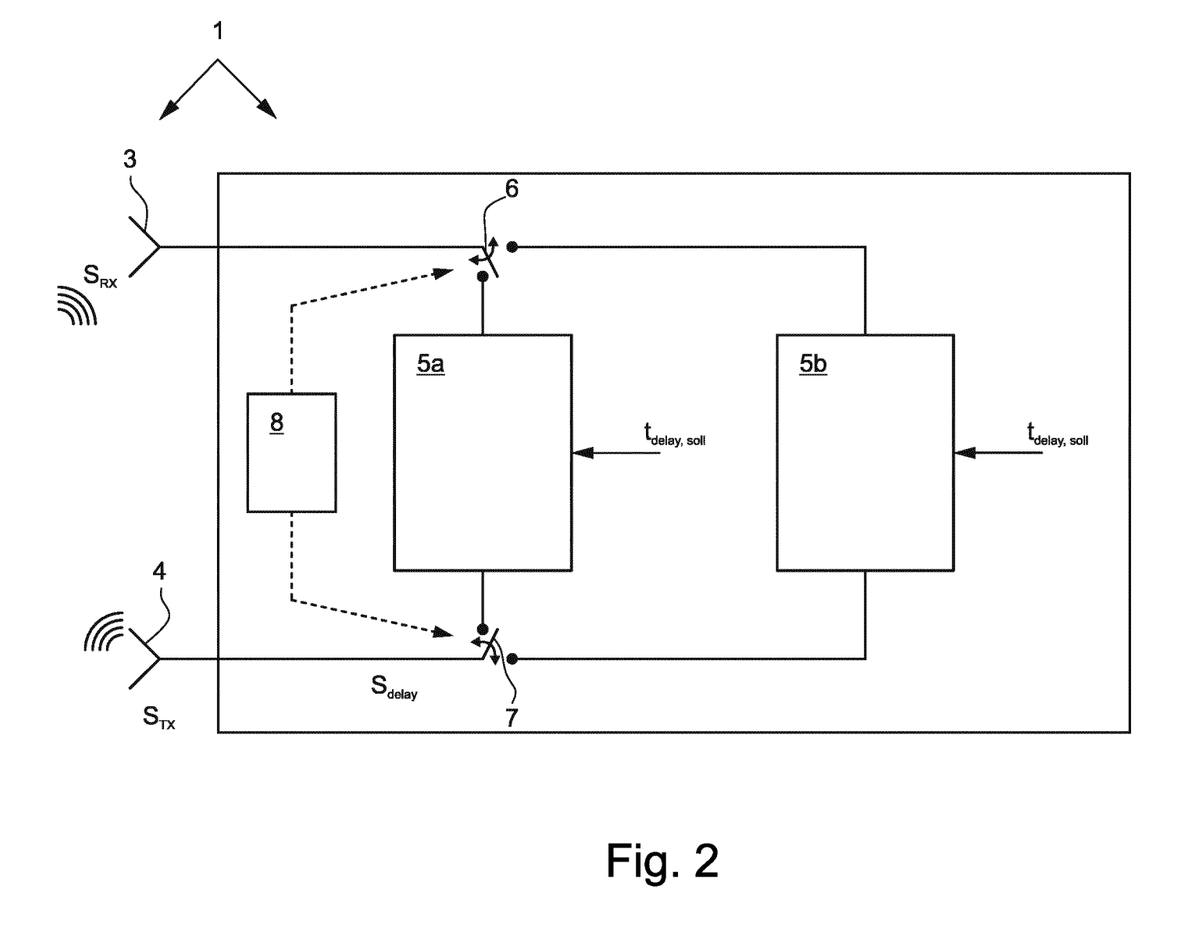
FIG. 2 illustrates a testing device with an analog delay path, a digital delay path as well as an input switch and an output switch.
Figure 3:
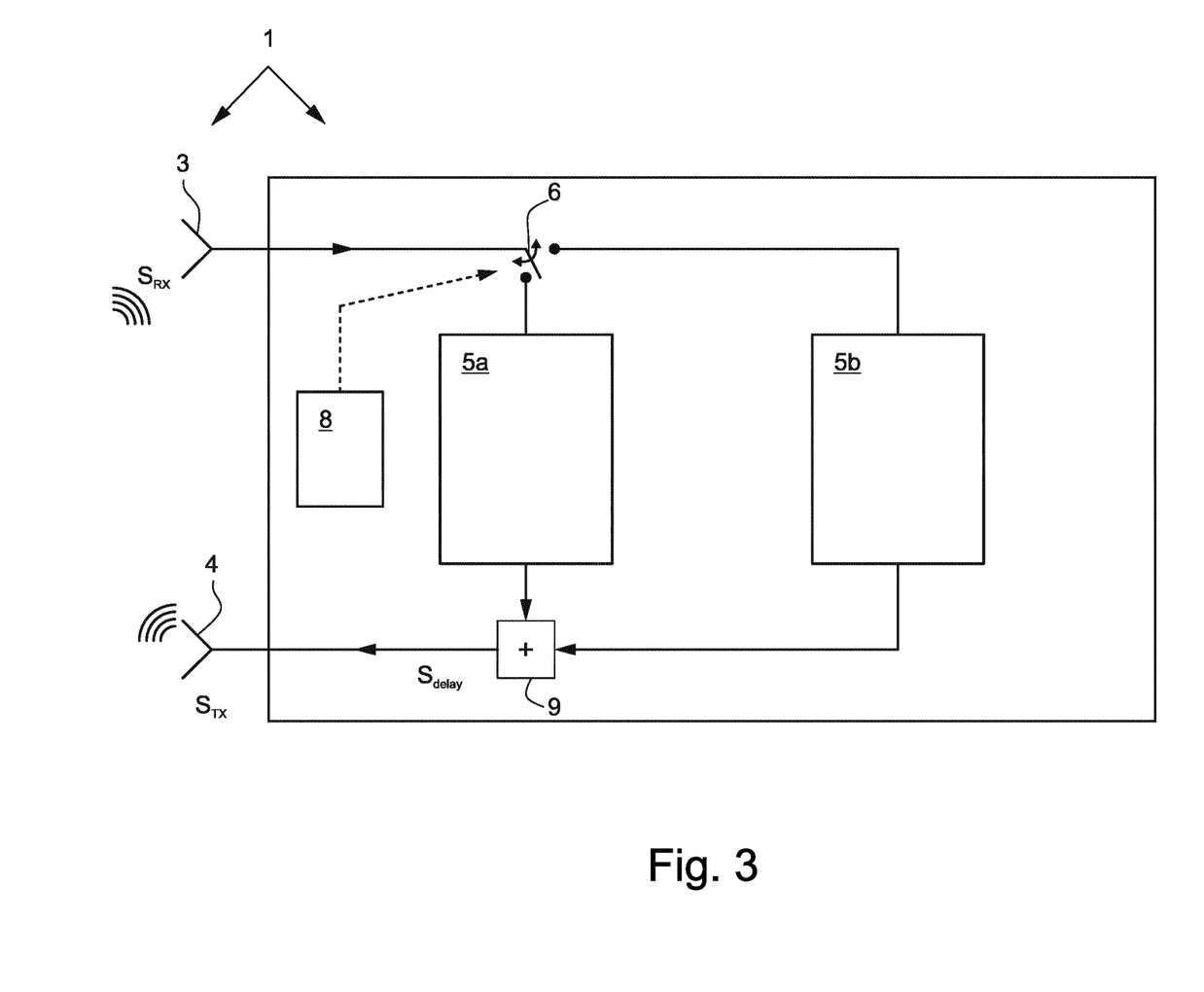
FIG. 3 illustrates a testing device with an analog and a digital delay path as well as an output summing unit.
Figure 4:
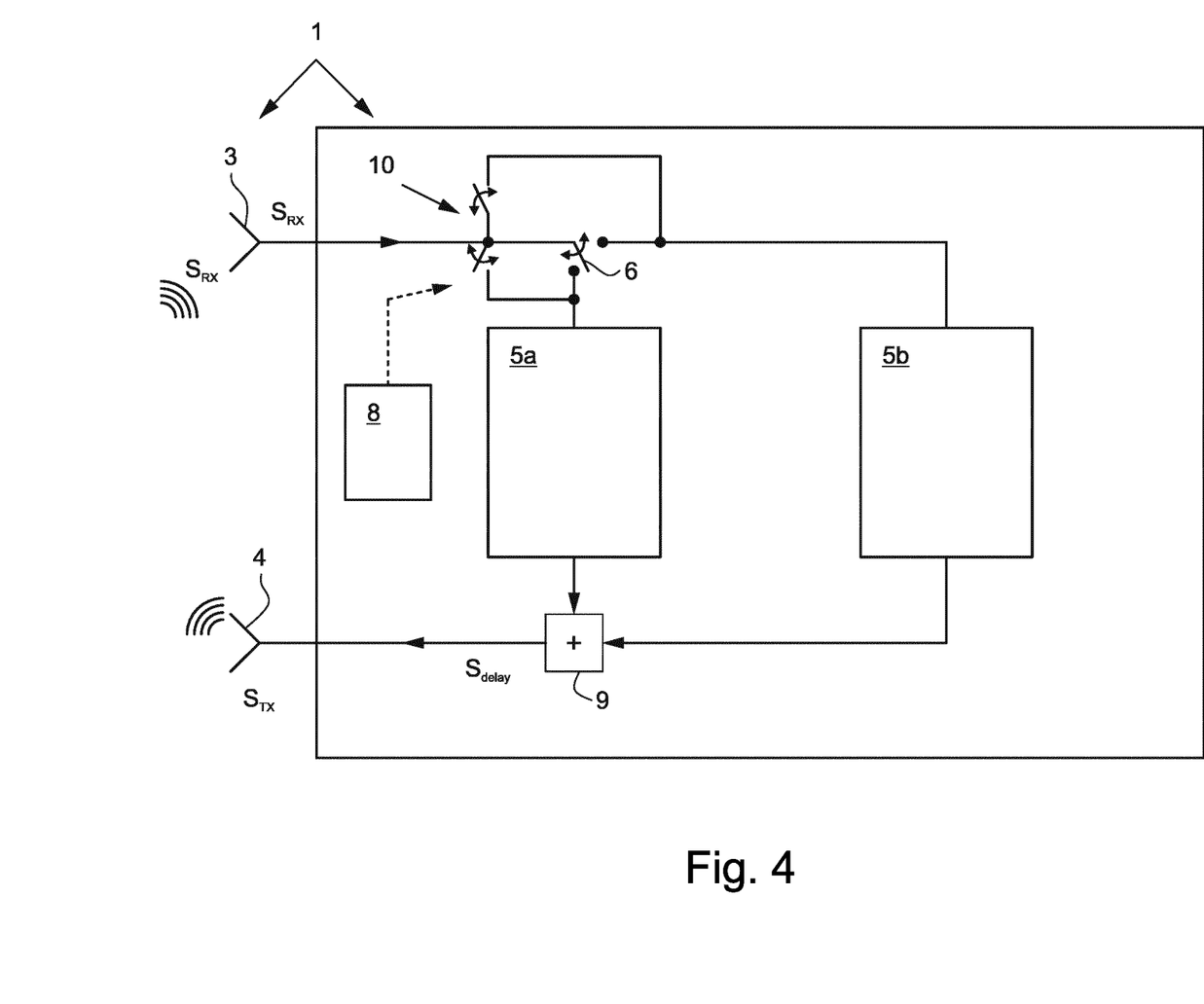
FIG. 4 illustrates a testing device with an analog and a digital delay path as well as a bridging device for the input switch.
Figure 5:
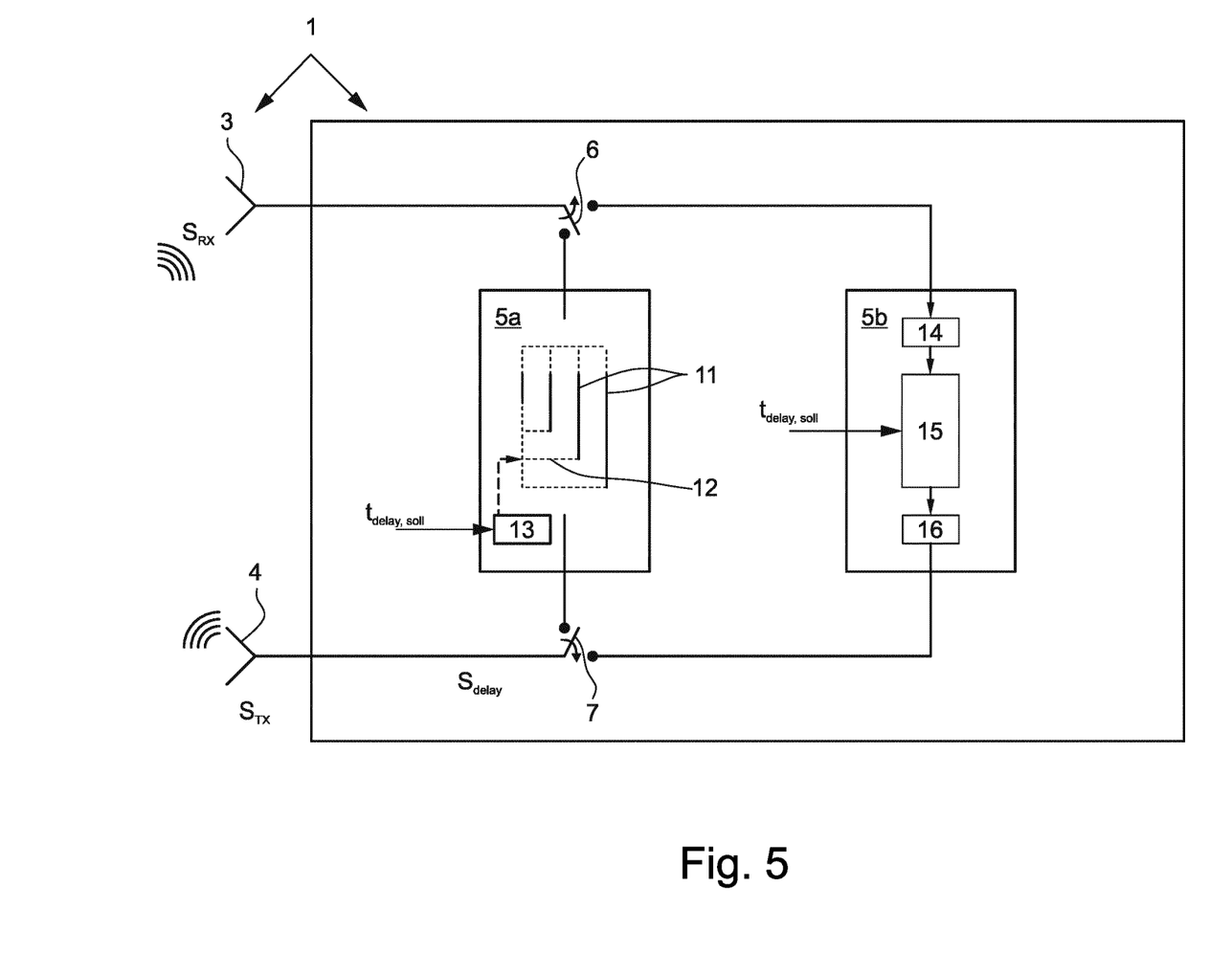
FIG. 5 illustrates a testing device with a more detailed representation of the analog delay path as well as the digital delay path.

In the testing devices 1 shown in FIGS. 2 to 6, it is now provided in each case that the time delay circuit 5 has an analog delay path 5a with a predeterminable time delay $t_{delay,soll}$ and a digital delay path 5b with a predeterminable time delay $t_{delay,soll}$. The delay times $t_{delay,soll}$ are shown in FIGS. 2 and 5 and, for better clarity, they are not shown separately in the other figures, but here too there are, of course, time delays $t_{delay,soll}$, which are specified accordingly. The predeterminable time delays $t_{delay,soll}$ can be the same for the analog delay path 5a and for the digital delay path 5b, but they can also differ from each other.

The delay paths 5a, 5b are implemented in such a manner that the analog delay path 5a implements shorter time delays than the digital delay path 5b, apart from a possible overlap area, in which a corresponding time delay $t_{delay}$ could be implemented by both delay paths 5a, 5b.

An input switch 6 connects the receive signal $S_{RX}$ or the signal $S'_{RX}$ derived from the receive signal $S_{RX}$ either to the input of the analog delay path 5a or to the input of the digital delay path 5b. After passing through the connected delay path, the signal then becomes the time-delayed signal $S_{delay}$. Due to the alternative application of either the analog delay path 5a or the digital delay path 5b, only one of the two delay paths 5a, 5b is active. If the input switches 6 are controlled sensibly, only that delay path will be operated which is capable of implementing a corresponding predetermined time delay $t_{delay,soll}$. This measure also prevents interference, for example in the form of signal cross-talk, between the delay paths.

FIG. 2 also shows that the output of the analog delay path 5a is contacted or the output of the digital delay path 5b is contacted by an output switch 7. In this manner, at least an indirect connection is established between the contacted output of the affected delay path 5a, 5b and the radiating element 4. In conjunction with the input switch 6, it can thus be ensured that only one of the two delay paths 5a, 5b, i.e., either the analog delay path 5a or the digital delay path 5b, has a signal effect on the output of the testing device 1, i.e., on the radiating element 4. For this, as also shown in FIG. 2, a control device 8 is provided which synchronously controls the input switch 6 and the output switch 7, so that—as already mentioned—either the analog delay path 5a is contacted on the input side and output side or the digital delay path 5b is contacted on the input side and output side.

Figure 6:
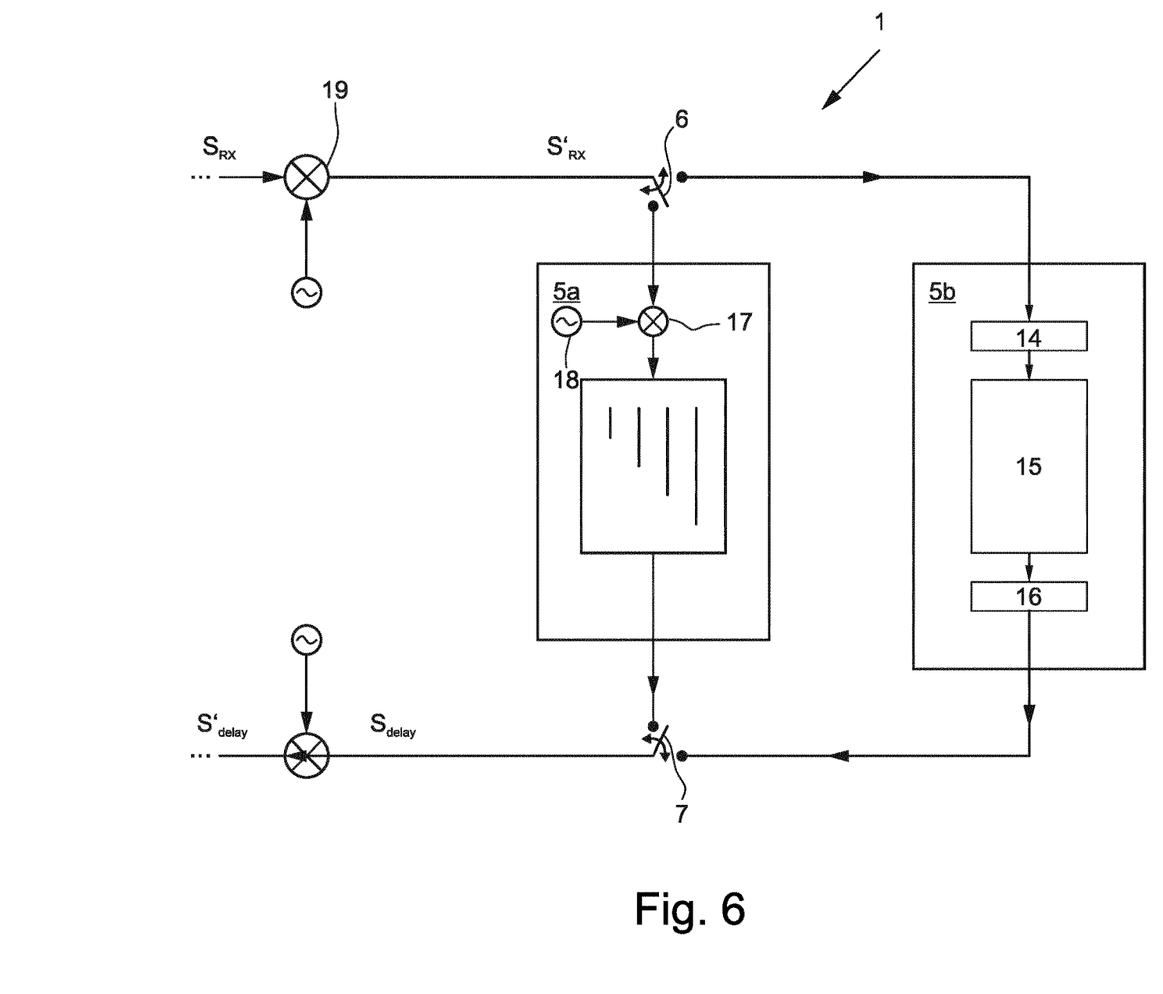
FIG. 6 illustrates a testing device having an analog and a digital delay path and a mixer in the analog delay path, a mixer in the input area of the overall circuit for generating an intermediate frequency and a mixer in the output area of the overall circuit for upmixing the frequency of the delayed signal.

To improve the clarity of the illustrations, FIGS. 5 and 6 do not show the control device 8 with regard to the control of the input switch 6 or the output switch 7. Of course, the control device 8 must also be present here in order to control the input switch 6 and/or the output switch 7.

As an alternative to using the output switch 7, an output summing unit 9 is provided in the embodiments in FIGS. 3 and 4. The output of the analog delay path 5a is contacted by an input of the output summing unit 9 and the output of the digital delay path 5b is contacted by another input of the output summing unit 9. The output summing unit 9 forms the sum signal from the output signal of the analog delay path 5a and the output signal of the digital delay path 5b. The output of the output summing unit then transmits the delayed sum signal—at least indirectly—to the radiating element 4. As a result of this measure, no output switch is initially required.

In a further design, however, the use of the output summing unit 9 is of particular importance, as shown in FIG. 4. FIG. 4 shows that a bridging device 10 above the input switch 6 ensures that the receive signal $S_{RX}$ (or a signal $S'_{RX}$ derived from the receive signal $S_{RX}$) is connected both to the input of the analog delay path 5a and to the input of the digital delay path. In this exceptional case, the analog delay path 5a and the digital delay path 5b are actually operated in parallel and simultaneously. The control of the bridging device 10, which is formed by two switching elements in the illustration according to FIG. 4, is also carried out by the control device 8 in the illustration. Simultaneous application of both the analog delay path 5a and the digital delay path 5b makes sense if the two delay paths 5a, 5b are to be given different time delays $t_{delay,soll}$. In this case, two objects with different distances can be simultaneously simulated by the testing device 1. This is a special case because the testing devices 1 shown having a receiving element 3 and a radiating element 4 are used to simulate a surrounding object with a certain azimuthal deflection with respect to the main orientation of the distance sensor. Several of the testing devices 1 described here are used in a test bench for this, wherein the testing devices 1 can be deflected azimuthally with respect to the distance sensor to be tested. The fact that two surrounding objects are arranged in exactly the same azimuthal direction and do not obscure each other, so that two distance signals would actually be expected, is a rare event in the environment simulation.

FIG. 5 shows a possible implementation of the analog delay path 5a and the digital delay path 5b in more detail. It can be seen that the analog delay path 5a has a plurality of analog delay sub-paths 11 which can be connected in series, a plurality of switches 12 (here only dashed lines are indicated) and a switching logic 13. A time delay $t_{delay,soll}$ can be predetermined for the switching logic 13. On the basis of this information, the switching logic 13 connects the delay sub-paths 11—at least partially—with switches 12 one after the other in such a manner that the predetermined time delay $t_{delay,soll}$ is achieved in the best possible manner.

The variation of the lengths of the analog delay sub-paths 11 is a special feature of the implementation of the analog delay path 5a shown in FIG. 5. The lengths of the analog delay sub-paths 11 behave like powers of two with respect to one another, i.e., they are binary parts. The length of a certain delay sub-path 11 thus doubles at the transition to the next longer delay sub-path 11. This clever division allows the number of required delay subpaths 11 to be kept to a minimum, and the proportion of switching points is also considerably reduced compared to other solutions (for example, if only identically long delay sub-paths are used).

This reduces the effort involved in implementing the analog delay path 5a and also parasitic effects—e.g., reflections on the switching points—are minimized during signal routing.

FIG. 5 further shows that the digital delay path 5b, seen from its input to its output and connected in series, comprises an analog-to-digital converter 14, a digital delay element 15 with a switching logic and a digital-to-analog converter 16. A time delay $t_{delay,soll}$ is also predeterminable for the switching logic, wherein the switching logic internally connects the digital delay element 15 in such a manner that the predetermined delay time $t_{delay,soll}$ is set in the best possible manner. In this case, the digital delay element 15 is implemented by a Field Programmable Gate Array, as is the switching logic. The digital delay path 5b represents a sampling system so that the analog-to-digital converter 14, the digital delay element 15 with the switching logic and also the digital-to-analog converter 16 operate in a time-discrete grid.

The embodiment shown in FIG. 6 is based on the knowledge that the sampling of the receive signal $S_{RX}$ or the receive signal $S'_{RX}$ derived from the receive signal $S_{RX}$ already carried out by the analog-to-digital converter causes periodically repeating spectra of the sampled receive signal when a frequency spectrum of the sampled signal is taken into account. This effect can therefore be used to process the sampled signal at a frequency different from the center frequency of the analog signal. In this case, an appropriate band-pass or low-pass filter is used to extract the desired frequency range. In order to obtain a signal with the same frequency at the output of the analog delay path 5a as at the output of digital delay path 5b, it is provided in the testing device 1 according to FIG. 6 that the analog delay path 5a comprises a mixer 17 and an oscillator 18, wherein the mixer 17 and the oscillator signal of the oscillator 18 are used to frequency shift the receive signal $S_{RX}$ or the signal $S'_{RX}$ derived from the receive signal $S_{RX}$ in such a manner that the output signal of the analog delay path 5a and the output signal of the digital delay path 5b have the same frequency, meaning the center frequency. This has the advantage that the downstream signal processing does not have to be designed differently or variably, depending on whether a signal is received from the analog delay path 5a or from the digital delay path 5b, rather one and the same components can then be used for further signal processing.

FIG. 6 also shows that the receive signal $S_{RX}$ is mixed down to a lower intermediate frequency by a mixer 19 before it is time-delayed, and the low-frequency signal $S'_{RX}$ derived from the receive signal $S_{RX}$ is then time-delayed. This measure is also possible with all other embodiments shown in the figures.

What is not shown in the figures, although it is implemented in a preferred design, is that a Doppler generator is connected between the outputs of the analog delay path 5a and the digital delay path 5b on the one hand and the radiating element 4 on the other hand, which Doppler generator frequency shifts the time-delayed signal $S_{delay}$ by a predeterminable Doppler frequency and thus generates the derived signal $S'_{delay}$. This measure can also be used to simulate radial velocity components of the simulated environment objects.

Figure 7:
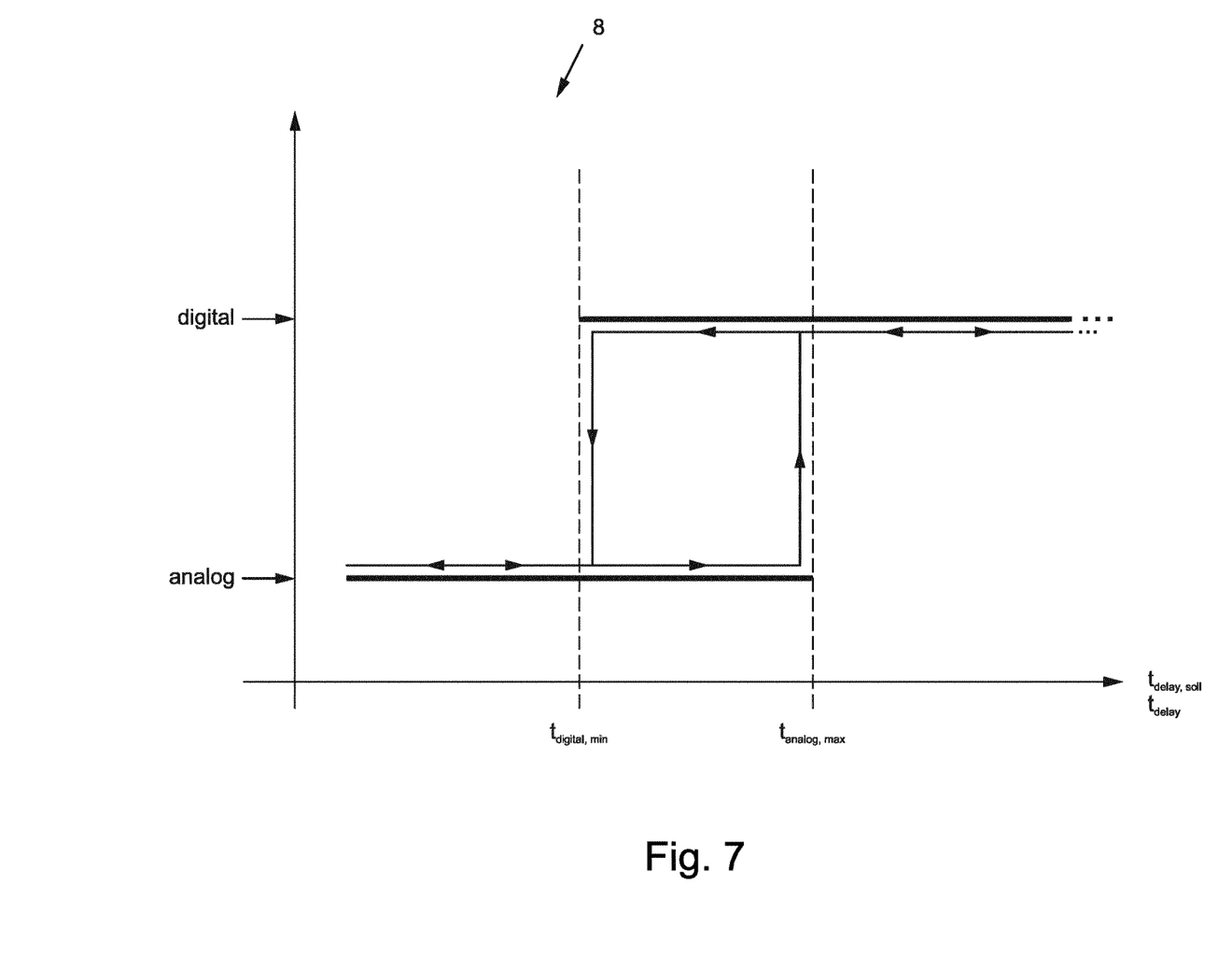
FIG. 7 illustrates a design of the control device for controlling the input switch and for switching between the analog delay path and the digital delay path with a hysteresis.

FIG. 7 shows a special switching strategy of the control device 8. Here it is assumed that the analog delay path 5a implements time delays $t_{delay}$ up to a maximum time delay $t_{analog,max}$ and that the digital delay path 5b implements time delays $t_{delay}$ up to a minimum time delay $t_{digital,min}$. The maximum time delay $t_{analog,max}$ of the analog delay path 5a is greater than the minimum time delay $t_{digital,min}$ of the digital delay path 5b, so that there is an overlap range from $t_{digital,min}$ to $t_{analog,max}$ in which both delay paths 5a, 5b can equally provide a corresponding signal delay. It is now provided that the control device 8 controls the input switch 6 in such a manner that, in the event of changing predetermined time delays $t_{delay,soll}$ in the overlap range of the time delays, the time delays are switched back and forth between the analog delay path 5a and the digital delay path 5b with a hysteresis. It is shown in FIG. 7, that it is only switched from the analog delay path (5a) to the digital delay path (5b) in the range of the maximum time delay $t_{analog,max}$ and, vice versa, it is only switched from the digital delay path (5b) to the analog delay path (5a) in the range of the minimum time delay $t_{digital,min}$. This avoids frequent switching back and forth between the analog delay path 5a and the digital delay path 5b, so that negative effects are also reduced during switching between the two delay paths 5a, 5b.

The invention claimed is:

1. A testing device for testing a distance sensor operating with electromagnetic waves, comprising:
    a receiving element for receiving an electromagnetic free-space wave as a receive signal; and
    a radiating element for radiating a simulated electromagnetic reflection signal;
    wherein the receive signal or a signal derived from the receive signal is routed via a time delay circuit with a predeterminable time delay, and is thus time-delayed to a time-delayed signal;
    wherein the time-delayed signal or a signal derived from the time-delayed signal is radiated as the simulated reflection signaler via the radiating element;
    wherein the time delay circuit has an analog delay path with a predeterminable time delay and a digital delay path with a likewise predeterminable time delay;
    wherein the analog delay path implements shorter time delays than the digital delay path apart from a possible overlap region; and
    wherein an input switch is used to switch the receive signal or the signal derived from the receive signaler either to the input of the analog delay path or to the input of the digital delay path and the signal becomes the time-delayed signal after passing through the connected delay path.

2. The testing device according to claim 1, wherein the output of the analog delay path or the output of the digital delay patch is contacted by an output switch, and at least an indirect connection is thus established between the contacted output of the delay path concerned and the radiating element.

3. The testing device according to claim 2, wherein a control device synchronously controls the input switch and the output switch so that either the analog delay path is contacted on the input side and output side or the digital delay path is contacted on the input side and output side.

4. The testing device according to claim 1, wherein the output of the analog delay section is contacted by an input of an output summing unit and the output of the digital delay section is contacted by a further input of the output summing unit, the sum signal is formed by the output summing unit from the output signal of the analog delay path and the output signal of the digital delay path, and the output of the output summing unit is connected at least indirectly to the radiating element.

5. The testing device according to claim 4, wherein a bridging device above the input switch ensures that the receive signal or a signaler derived from the receive signal is connected both to the input of the analog delay path and to the input of the digital delay path.

6. The testing device according to claim 1, wherein the analog delay path has a plurality of analog delay sub-paths which can be connected in series, a plurality of switches and a switching logic; and wherein the switching logic is able to be preset with a time delay, and the switching logic connects the delay sub-paths in series with the switches in such a manner that the predetermined time delay is achieved in the best possible manner.

7. Testing The testing device according to claim 6, wherein the lengths of the analog delay sub-paths behave like powers of two with respect to one another.

8. Testing The testing device according to claim 1, wherein the digital delay path, viewed from its input to its output and connected in series, has an analog-to-digital converter, a digital delay element with a switching logic and a digital-to-analog converter;

wherein a delay time can be predetermined for the switching logic and the switching logic internally switches the digital delay element such that the predetermined delay time is achieved in the best possible manner; and wherein at least one of the digital delay element and the switching logic is implemented by an FPGA.

9. The testing device according to claim 8, wherein the analog delay path has a mixer and an oscillator; and wherein the receive signal or the signal derived from the receive signal is frequency-shifted by the mixer and the oscillator signal in such a way that the output signal of the analog delay path and the output signal of the digital delay path have the same frequency.

10. The testing device according to claim 1, wherein the receive signal, before being time-delayed, is mixed down with a mixer to a lower intermediate frequency and the low-frequency signal thus derived from the receive signal is then time-delayed.

11. The testing device according to claim 1, wherein a Doppler generator is interposed between the outputs of the analog delay path and the digital delay path and the radiating element, which Doppler generator frequency shifts the time-delayed signal by a predeterminable Doppler frequency and thus generates the derived signal.

12. The testing device according to claim 1, wherein the analog delay path implements time delay up to a maximum time delay and the digital delay path implements time delay up to a minimum time delay;

wherein the maximum time delay of the analog delay pat is greater than the minimum time delay of the digital delay path so that an overlap range of time delays exists; and wherein a control device controls the input switch in such a manner that, in the event of changing predetermined time delays in the overlap range, the time delays are switched back and forth with a hysteresis between the analog delay path and the digital delay path, and the input switch is only switched from the analog delay path to the digital delay path in the range of the maximum time delay and vice versa is only switched from the digital delay path to the analog delay path in the range of the minimum time delay.

* * * * *